United States Patent
Pfeiffer

(10) Patent No.: US 9,003,211 B2
(45) Date of Patent: Apr. 7, 2015

(54) METHOD AND APPARATUS FOR HOLISTIC POWER MANAGEMENT TO DYNAMICALLY AND AUTOMATICALLY TURN SERVERS, NETWORK EQUIPMENT AND FACILITY COMPONENTS ON AND OFF INSIDE AND ACROSS MULTIPLE DATA CENTERS BASED ON A VARIETY OF PARAMETERS WITHOUT VIOLATING EXISTING SERVICE LEVELS

(75) Inventor: Clemens Pfeiffer, Sunnyvale, CA (US)

(73) Assignee: Power Assure, Inc., Santa Clara, CA (US)

( * ) Notice: Subject to any disclaimer, the term of this patent is extended or adjusted under 35 U.S.C. 154(b) by 732 days.

(21) Appl. No.: 12/051,833

(22) Filed: Mar. 19, 2008

(65) Prior Publication Data

US 2009/0240964 A1    Sep. 24, 2009

(51) Int. Cl.
    *G06F 1/32*    (2006.01)

(52) U.S. Cl.
    CPC ............ *G06F 1/3203* (2013.01); *G06F 1/3209* (2013.01)

(58) Field of Classification Search
    USPC .......... 713/320, 321, 323, 324, 1, 2; 709/223, 709/201
    See application file for complete search history.

(56) References Cited

U.S. PATENT DOCUMENTS

| | | | |
|---|---|---|---|
| 7,143,300 B2 * | 11/2006 | Potter et al. .................... | 713/323 |
| 7,274,975 B2 | 9/2007 | Miller | |
| 7,644,148 B2 * | 1/2010 | Ranganathan et al. ....... | 709/223 |
| 7,783,390 B2 | 8/2010 | Miller | |
| 7,908,605 B1 * | 3/2011 | Graupner et al. ............. | 718/104 |
| 8,041,970 B2 * | 10/2011 | Oh et al. ........................ | 713/320 |
| 2003/0055969 A1 * | 3/2003 | Begun et al. .................. | 709/226 |
| 2003/0193777 A1 * | 10/2003 | Friedrich et al. ............. | 361/687 |
| 2004/0158360 A1 | 8/2004 | Garland et al. | |
| 2004/0163001 A1 * | 8/2004 | Bodas ........................... | 713/300 |
| 2005/0055590 A1 * | 3/2005 | Farkas et al. .................. | 713/320 |
| 2005/0228618 A1 * | 10/2005 | Patel et al. ..................... | 702/188 |
| 2006/0229847 A1 | 10/2006 | Nakajima | |
| 2006/0235574 A1 | 10/2006 | Lapinski et al. | |
| 2007/0028239 A1 * | 2/2007 | Dyck et al. ........................ | 718/1 |
| 2007/0074220 A1 * | 3/2007 | Edwards et al. .............. | 718/104 |
| 2007/0245165 A1 * | 10/2007 | Fung ............................. | 713/320 |
| 2007/0250838 A1 * | 10/2007 | Belady et al. ................. | 718/105 |
| 2008/0065919 A1 * | 3/2008 | Hatasaki et al. .............. | 713/324 |
| 2008/0141048 A1 * | 6/2008 | Palmer et al. ................. | 713/300 |

(Continued)

*Primary Examiner* — Vincent Tran
(74) *Attorney, Agent, or Firm* — Byrne Poh LLP

(57) ABSTRACT

The present invention provides a METHOD AND APPARATUS FOR HOLISTIC POWER MANAGEMENT TO DYNAMICALLY AND AUTOMATICALLY TURN SERVERS, NETWORK EQUIPMENT AND FACILITY COMPONENTS ON AND OFF INSIDE AND ACROSS MULTIPLE DATA CENTERS BASED ON A VARIETY OF PARAMETERS WITHOUT VIOLATING EXISTING SERVICE LEVELS. This method and apparatus pertains specifically to a method and apparatus for power management in data centers and large server environments.

Until today all servers running a specific application or virtualized environment are kept turned on to support various levels of application demand. With the invention of Holistic Power Management this invention completely automates the tasks required to shutdown and turn off servers not needed and to turn them on and start them up independent of their physical location. Furthermore this invention makes such changes dynamically based on application load, environmental conditions and energy pricing and availability and can adjust cooling services accordingly.

16 Claims, 6 Drawing Sheets

(56) References Cited

U.S. PATENT DOCUMENTS

| | | | |
|---|---|---|---|
| 2008/0301479 A1* | 12/2008 | Wood | 713/322 |
| 2009/0077398 A1* | 3/2009 | Bland et al. | 713/320 |
| 2009/0083263 A1 | 3/2009 | Felch et al. | |
| 2009/0106571 A1* | 4/2009 | Low et al. | 713/310 |
| 2009/0119233 A1* | 5/2009 | Dunagan et al. | 705/412 |
| 2009/0150700 A1* | 6/2009 | Dell'Era | 713/324 |
| 2009/0158072 A1* | 6/2009 | Radhakrishnan et al. | 713/340 |
| 2009/0171511 A1* | 7/2009 | Tolentino | 700/297 |
| 2009/0187782 A1* | 7/2009 | Greene et al. | 713/340 |
| 2009/0216910 A1 | 8/2009 | Duchesneau | |
| 2009/0218078 A1* | 9/2009 | Brunschwiler et al. | 165/104.33 |
| 2009/0235097 A1* | 9/2009 | Hamilton et al. | 713/320 |
| 2010/0010678 A1 | 1/2010 | Dawson et al. | |
| 2010/0057641 A1 | 3/2010 | Boss et al. | |
| 2010/0235840 A1* | 9/2010 | Angaluri | 718/102 |
| 2011/0077795 A1 | 3/2011 | VanGilder et al. | |
| 2011/0252254 A1* | 10/2011 | Kameda et al. | 713/320 |

\* cited by examiner

METHOD AND APPARATUS FOR HOLISTIC POWER MANAGEMENT TO DYNAMICALLY AND AUTOMATICALLY TURN SERVERS, NETWORK EQUIPMENT AND FACILITY COMPONENTS ON AND OFF INSIDE AND ACROSS MULTIPLE DATA CENTERS BASED ON A VARIETY OF PARAMETERS WITHOUT VIOLATING EXISTING SERVICE LEVELS

PRIORITY CLAIM/RELATED APPLICATION

This patent application claims the benefit under 35 USC 119(e) to U.S. Provisional Patent Application Ser. No. 60/919,032 filed on Mar. 20, 2007, the entirety of which is incorporated herein by reference.

CROSS-REFERENCE TO RELATED APPLICATIONS

This Application claims the benefit of Provisional Patent Application Ser. No. 60/919,032, filed Mar. 20, 2007 by the present inventor.

BACKGROUND OF THE INVENTION

This present invention relates to power management in data centers and large server environments.

Servers and other information technology equipment consume large amounts of energy and create large amounts of heat even when idle or lightly used. Large applications like online banking, search or news web sites, amongst others and virtualized application environments typically require multiple servers within a single data center or spread across different data centers that are physically placed in different locations to support heavy load, reduce the risk for outages and provide response times that cannot be achieved with use of a single server. Such response time and availability is defined with service levels that set acceptable response time and availability for each application. To maintain service levels all servers usually run 24 hours a day, 7 days a week to ensure that during peak demand the overall application still meets such performance levels and load never exceeds available capacity. However, usual average monthly utilization of these servers may well be as low as 4% with a couple of short peaks that bring utilization up to 80-90%.

In addition to the power consumption of the servers and other information technology equipment, such equipment also generates large amounts of heat that requires active cooling. For every Watt of power consumed by any such equipment, data centers have to factor in an additional 20% to 200% of power consumption for cooling services. Using outside air can bring this energy requirement down, whereas heavy air conditioning can increate it in warmer regions.

Looking to the power consumption of servers and other information technology equipment shows that any equipment requires power as soon as it is plugged into an outlet. The amount of power when the equipment is turned off ("off state") can be anywhere from 1% to 25% of its maximum power consumption under full load. Equipment is turned on and it runs through its startup sequence and settles at an "idle state"—a state at which no application functionality is executed but the operating system is up and running. When applications are running and application load is added to the equipment, the power consumption will increase up to a maximum power consumption ("loaded state") at which the equipment runs at peak performance and performs at maximum capacity/efficiency. During any type of intermediate load, power consumption fluctuates between idle and loaded levels. Idle power consumption typically exceeds 60% of loaded power consumption and can be as high as 90% depending on the type of equipment used and as a result the additional power required to add load is relatively small compared to the power used by equipment that is just turned on but in an idle state.

While power consumption is related to the equipment and load levels of such equipment, the additional power for cooling as well as the cost of power depends primarily on the location of the data center where the equipment is placed. As network distance is a factor in response time and latency and also influences service levels, it is not always possible to pick a data center location with the lowest power cost. Furthermore the cost of power increases continuously due to shortage and an overall increase in worldwide demand.

While there are various methods and systems that can help reduce the power consumption of equipment like: more efficient hardware, power capping, sleep mode, stopping (parking) of hard-disks when idle, and other hardware related solutions, they all focus solely on the reduction of power consumption of a single device. Another method and system used to reduce power consumption is virtualization that allows consolidating the total number of servers and allows combining multiple applications onto a single server, as a result of the reduced number of servers, the power consumption of such a group of servers will also be reduced. Even after all the efficiency improvements undertaken, the fundamental high power consumption of an idle piece of equipment relative to its loaded power consumption is still the same, because of the relatively high power use at an idle state.

To solve the limitations of prior art, this method and apparatus takes a holistic approach by looking at a complete application environment with servers and equipment in a variety of locations that can be optimized together within and across facilities. Furthermore this invention dynamically and automatically adds and removes equipment from an application depending on load and physically turns off equipment when not needed and then back on as demand rises. The result is that invention specified equipment no longer wastes power while idle or close to idle, but instead runs at a more beneficial (e.g. 70% to 80%) average load and invention specified equipment that is not currently needed is physically turned off.

FIELD OF THE INVENTION

The present invention relates to software.

Moreover, this invention pertains specifically to a method and apparatus for power management in data centers and large server environments.

DESCRIPTION OF RELATED ART

Today software is used to monitor data centers, manage servers and support operating people with the intent to keep all servers running at all times. Battery backup, UPS, generator, and co-generation facilities are installed to provide continuously power to such servers, even when utility companies fail to provide power.

Furthermore, various methods and systems have been developed to balance load across multiple servers to allow large applications to use more than one server and keep load levels in close proximity of each other without overloading a single component.

Furthermore, various methods and systems have been developed to cap power consumption of servers and equipment or slow down the CPU of such equipment. In all cases the power consumption is reduced but also the overall performance during such times is reduced and if done during idle times, any power is wasted, if done during loaded times, the number of transactions is reduced, effectively increasing the cost per transaction, requiring additional servers and equipment to compensate for the lost computing capacity.

Furthermore, various methods and systems have been developed to turn off or dim lights and reduce air conditioning in buildings. While such solutions are time of day, motion or demand response event driven, they are not applicable to server environments due to the dynamic load on applications and if used would reduce the overall computing capacity of the server environment leading to potential problems with the application service levels.

This invention uses existing best practices, methods and products and adds a method and apparatus that will automatically turn on and off servers, and shutdown and startup equipment, dynamically and with complete (or full) automation to achieve the benefits of reducing power costs by turning off unneeded equipment without any risk to service levels and without any changes to the total available computing capacity.

SUMMARY OF THE INVENTION

In view of the limitations of the prior art, this invention takes a holistic approach by looking at the total computing requirements for an application within one location, across multiple locations, load balanced, virtualized or in a cluster configuration and comparing said computing requirements to the total computing capacity required to run said application at any given moment in time with enough buffer to insure application service levels.

Furthermore, the present invention shows a method and apparatus that will adjust by application load on computing equipment within predefined levels and adds and removes computing equipment automatically and dynamically as needed to provide enough computing capacity to keep load levels within such predefined levels continuously independent of increasing or decreasing application demand.

Furthermore, this invention looks at variable cost of energy by location and time, required minimum computing capacity at each location at said time, availability and emergency scenarios, and maps out a recommended list of servers and network equipment that must run, plus a user defined safety buffer that automatically and territorially, shuts down all other servers and network equipment that are not needed at such time, until it is required again, and then restarts and re-instates said equipment automatically with this invention to its full functionality.

Furthermore, this invention physically turns off servers and other equipment when not needed. This can be done within or ideally outside of the equipment to also eliminate off-power consumption but is not limited to any specific configuration.

Moreover, this invention identifies associated excess cooling related to turning on and off equipment and proactively identifies, reduces and increases such cooling equipment in a manner that allows timely adjustments of such equipment as expected within an adjustment time window.

As a result, the energy consumption for an application that uses multiple servers within a single or across multiple locations drops significantly. This energy drop is much greater in extent than any other method or product could provide.

Furthermore, service levels are not violated, as there is always enough spare capacity (buffer) available to support ongoing and expected demand until the next adjustment is completed.

DESCRIPTION OF THE DRAWINGS

To outline the details of the invention, the following figures have been created.

Centralized Components:

Holistic Power Management™: The core calculation component that continuously calculates the amount of servers needed to support actual application load. The calculations are done by the DDM ("Dynamic Deterministic Model") Cell Engine as outlined in FIG. 2.

XML I/F Services: A web services interface that communicates with remote locations through XML data packages Database: A central archive that holds all information like measurements, configurations, inventory, calculation results, change logs, reference measurements, etc.

Utility Grid Information: A module that collects utility information like energy pricing, alerts, availability, etc. from power utility companies.

Device Reference Details: A module to collect device power consumption details like off, idle, and loaded power consumption; power on spike, boot cycle power consumption, boot cycle duration, benchmark power consumption and application load and transactions/kwh.

Components at Each Data Center or Equipment Site/Location:

Supply Balancer: A component that will be installed at each site/location to collect measurement data from power meters from the utility feed all the way to meters in each rack. This component will optionally adjust cooling as needed based upon invention specific calculations and equipment adjustments.

Demand Balancer: A component that will be installed at each site/location to collect measurement data from servers and application management components. This component will also adjust capacity by shutting down servers, starting up servers, turning off servers, turning on servers, powering off and on associated network equipment or additional components.

Application Feeds: A web service that allows for custom integration with application, network and system monitoring and management solutions for them to feed additional details to the database.

One or more of these components can be connected to the centralized components.

Figure 2:
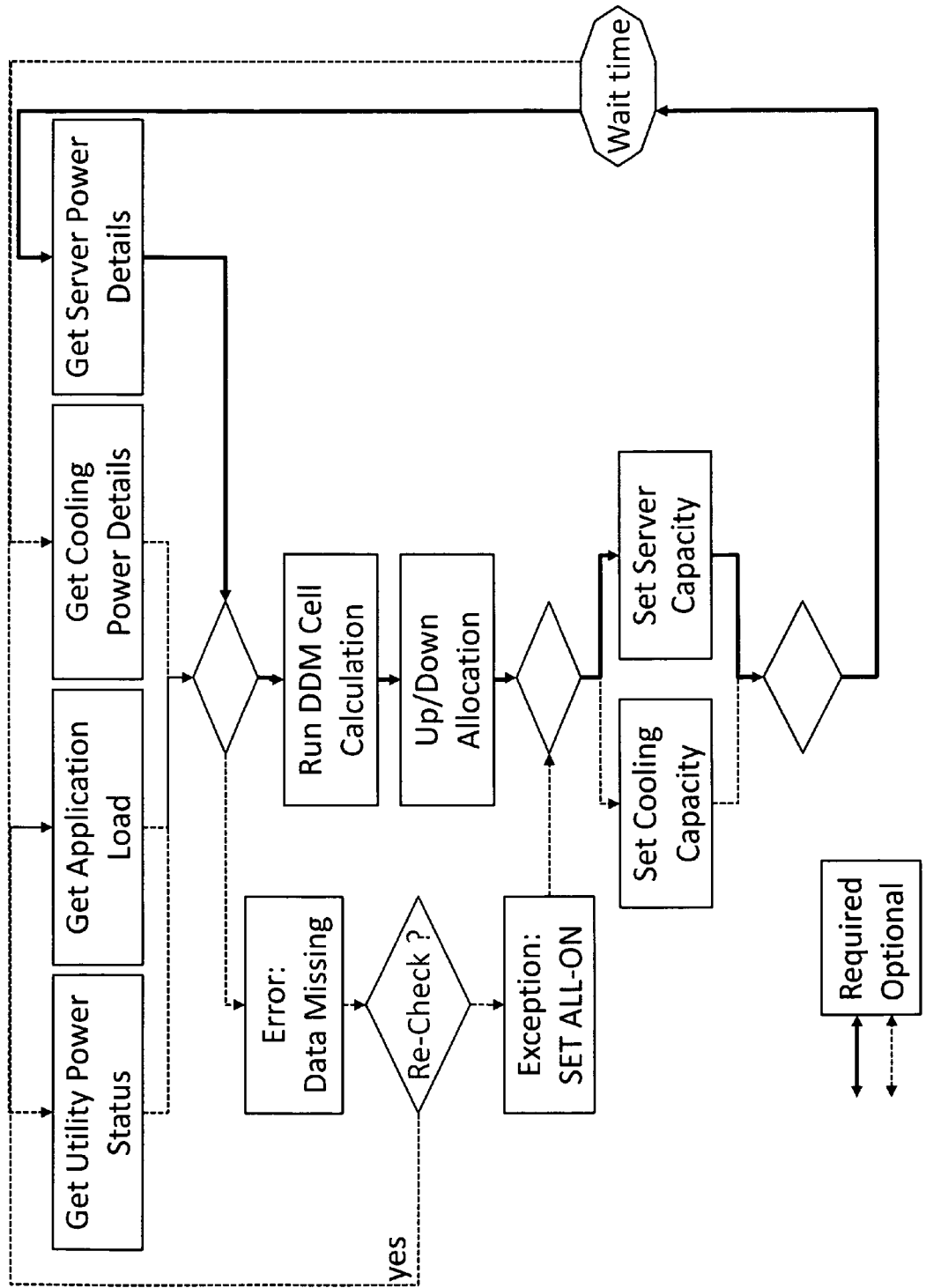

FIG. 2 shows the method of the Holistic Power Management™ core calculation component. Running in a continuous cycle, the calculation component takes the utility grid information, application load, cooling power consumption details and server power consumption details, runs the DDM Cell Calculation that returns the number of servers needed at any given time, runs the up/down adjustment model to define which devices to turn on or off and subsequently performs the cooling and server/device adjustments. Required steps include getting the application load, getting the server power details, running the DDM Cell Calculation, performing the up/down allocation and activating adjustments to the server capacity. Optional steps include the checks of the utility grid information and cooling details and activating cooling adjustments. Error handling is included for can missing data. Any error/exception will lead to an "ALL-ON" setting by which all systems will be turned back on until errors/exceptions have been resolved.

Figure 3:
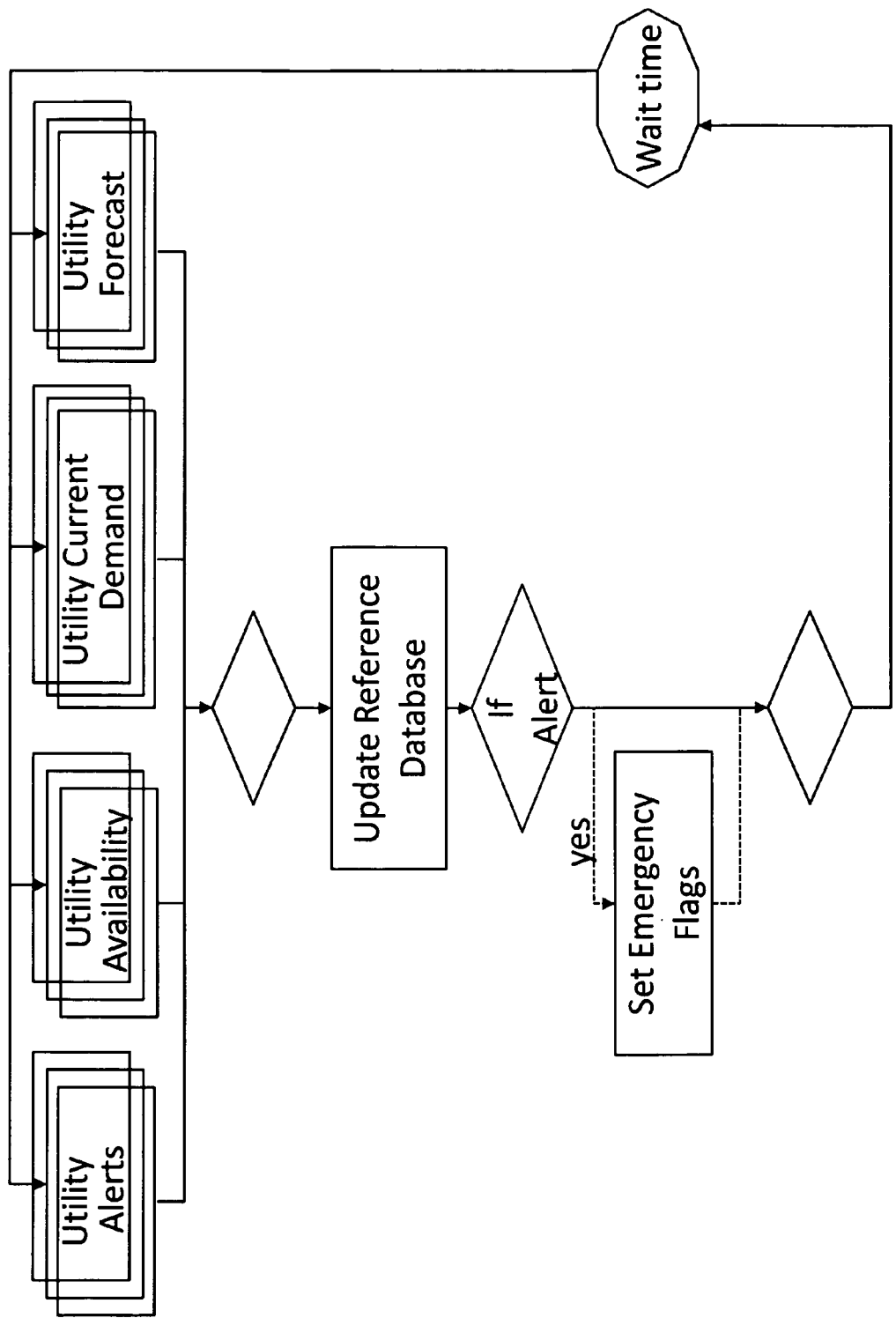

FIG. 3 shows the method in how utility information and alerts are collected. This model is continuously executed and will collect utility alerts, utility availability, current utility demand and utility forecast information from any utility company for every location under management; all data is stored in the database and emergency flags are set in case of utility alerts. The wait time for re-checking with the utility companies can be defined but is typically 5 minutes or less.

Figure 4:
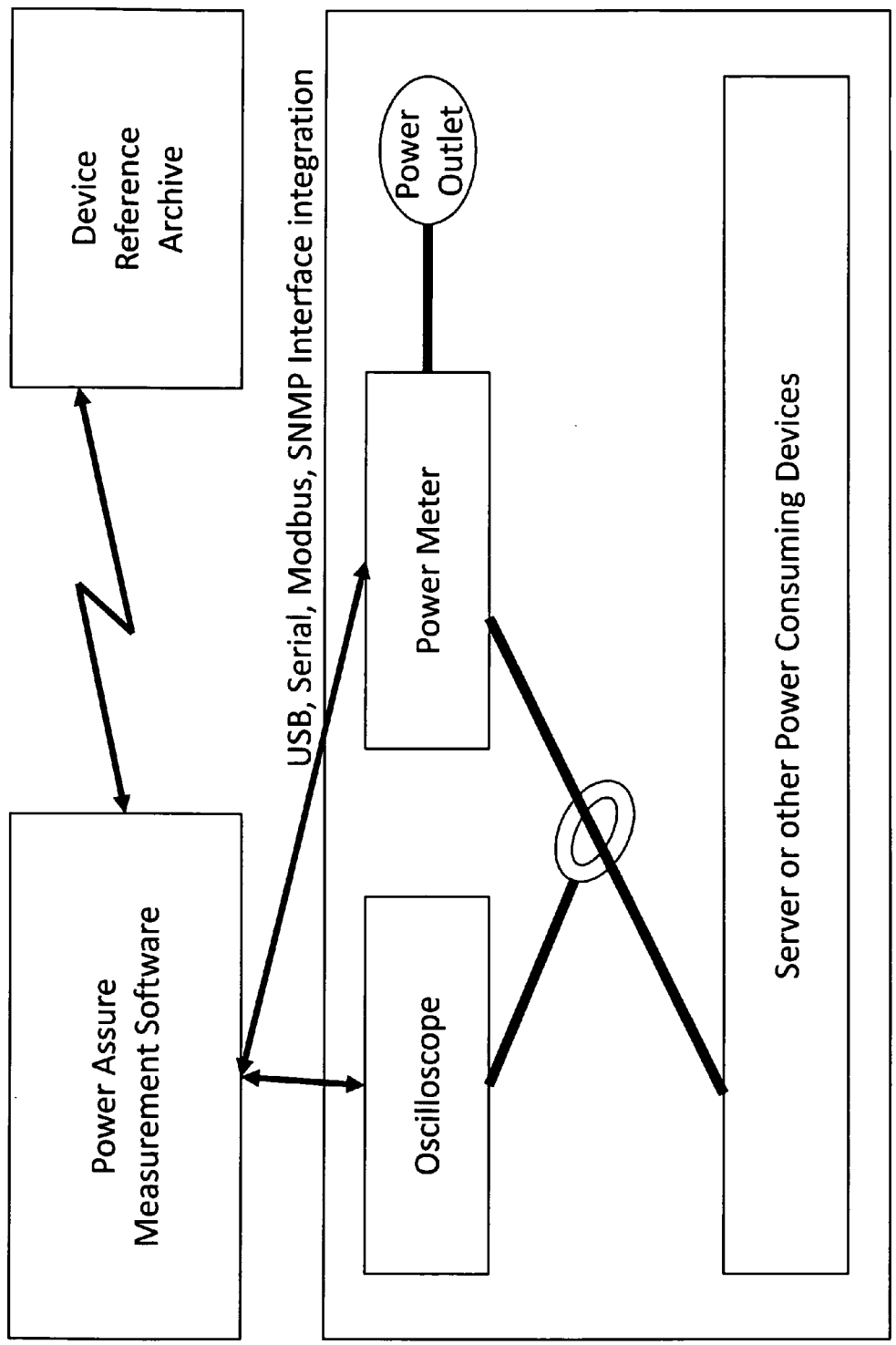

FIG. 4 shows the method of creating the device reference measurement data. Using a power meter AND oscilloscope the power consumption of a server and/or other power consuming device is measured. Software is used to collect the data from the power meter and oscilloscope and uploaded to the device reference database. Such measurements include but are not limited to power consumption when a device is just plugged in but turned off, when running idle, when running under full load, during power-on, during a boot cycle, during specific benchmark load levels and customer specific application measurements. The result is a detailed characteristic of the power consumption of a server/device and a transaction/kwh rating that indicates more or less efficient equipment.

Figure 5:
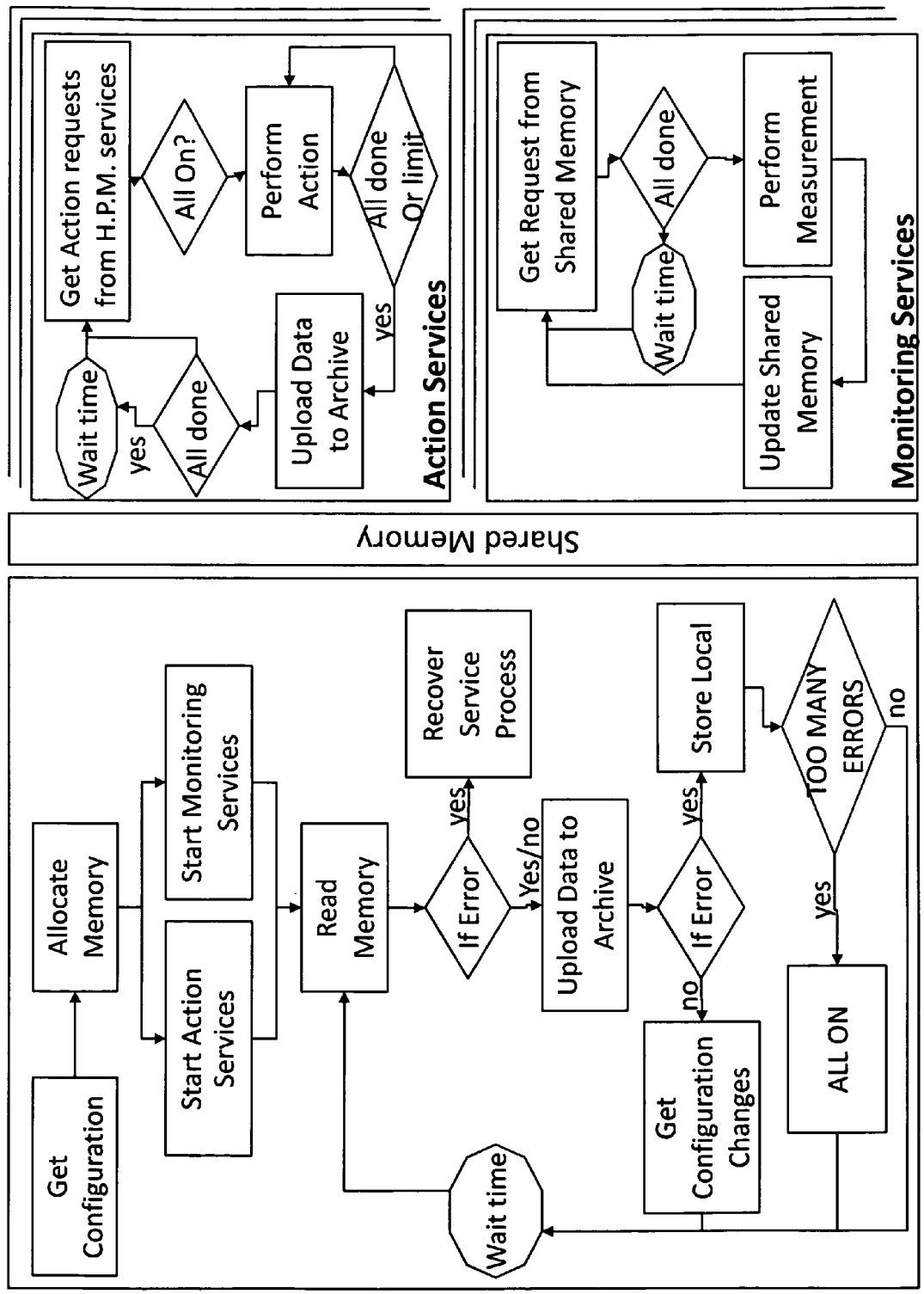

FIG. 5 shows the method of execution on the demand and supply balancers. There is a main program that gets the initial configuration, allocates shared memory and starts the action and monitoring services that communicate with the main program via shared memory. The shared memory is read and if there is no error the data will be uploaded to the centralized services. If there is an error with one of the local services, they will be automatically restarted. If there is an error with the communication to the centralized services the data will be stored locally and after a certain amount of cycles, the service will go into "fail safe" mode and turn all equipment on. After uploading the data the main program will download any configuration changes and/or action service requests and updated the shared memory for the action and monitoring services.

One or more action services and one or more monitoring services can be started to support the full configuration within a single loop executed by the main program.

Action services will read action requests from shared memory and perform the action. If there are more than one action, they will be executed in an ongoing loop. If all action requests are done or if a certain limit has been reached, the service will update the shared memory with the results and if there are no requests any more, fall into a configurable wait time until reading the shared memory for new action requests again.

Monitoring services perform measurements by reading each request from the shared memory, performing the measurement and updating the shared memory with the result. When all measurements are done, the monitoring service will wait for a configurable amount of time before reading from shared memory again looking for new measurements to perform.

Figure 6:
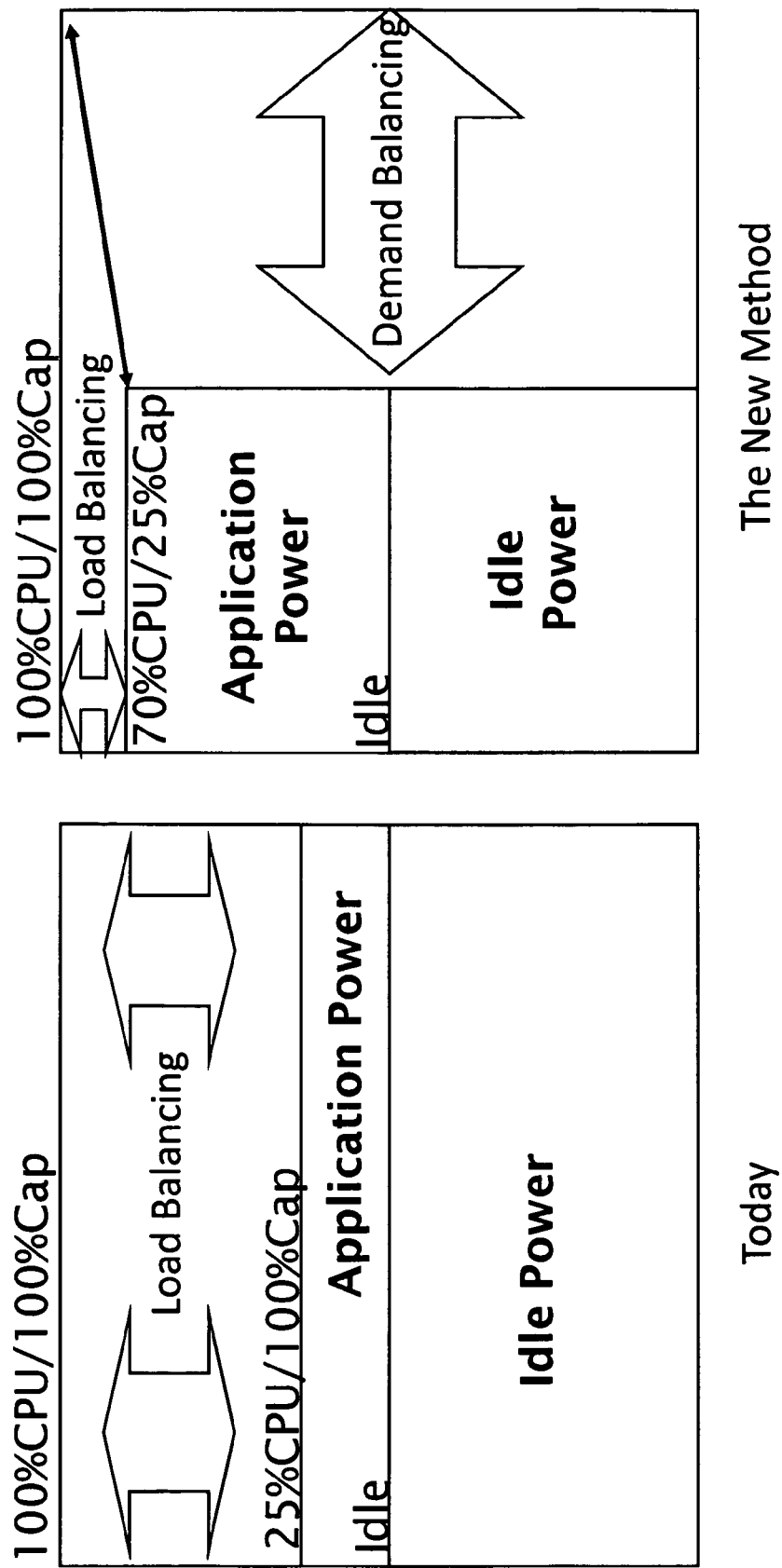

FIG. 6 shows the method of demand balancing. Unlike the well known method of load balancing that distributes application load across all servers equally, demand balancing adds a second dimension to a load balanced, virtualized or application clustered environment with the option to add and remove servers to keep load levels at an higher average utilization, reducing "idle power" (power used to run an idle server) with just minor increases in "application power" (power above idle levels depending on load) but with no negative effect to the full capacity of the environment or the application service levels.

DETAILED DESCRIPTION OF THE INVENTION

Figure 1:
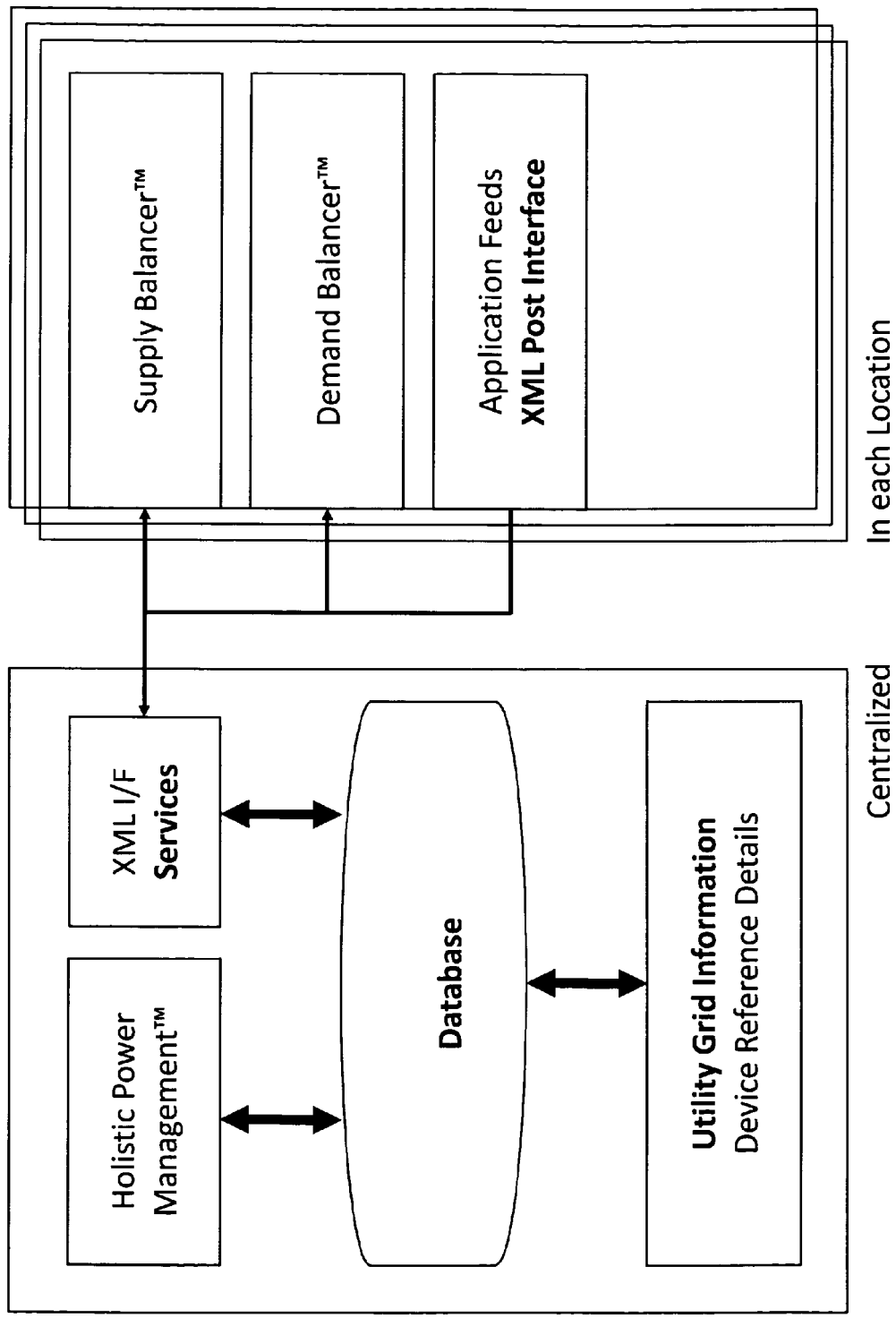
FIG. 1 shows the overall architecture of the apparatus with its main components.

In one aspect, the present invention fulfills the above described needs in the art by providing a new, end-to-end method and apparatus for holistic power management that has many novel features and advantages not offered by the prior art, like:

1. A method of holistic power management to optimize the amount of servers and computing equipment needed to safely run large load balanced, virtualized or clustered applications without loss in total computing capacity and without reduction of service levels. (FIG. 6)
2. A method to measure, classify, and rate computing equipment based on power consumption and transactions per kWh of energy use. (FIG. 4)
3. A method and apparatus to create equipment reference measurements including off, standby, idle, loaded power consumption and transactions/kWh ratings. (FIG. 3)
4. A method and apparatus to calculate the amount of servers, network equipment and facility components needed at any given time. (Formula)
5. A method and apparatus to calculate the specific servers, network components, and facility components that can be turned on, down, or off to satisfy the excess capacity buffer characterized by the application user.
6. A method and apparatus to dynamically and automatically turn servers, network equipment and facility components on, down and off within a single data center and across multiple data centers based on a variety of parameters using above mentioned methods. (FIGS. 1, 2, and 5)

The result is a new method and apparatus for holistic power management, which is not apparent, obvious, or suggested, either directly or indirectly by any of the prior art.

The Method of Holistic Power Management

The method presented in this invention leverages power and power on characteristics of servers and other data center equipment to determine the most efficient load levels for equipment, adjusted by required computing capacity buffers.

For example, let's take a server farm with 100 servers; these 100 servers will run most efficient (the point where the number of transactions per kW in power consumption is the highest) close to 100% of their capacity ("optimized load level" also called DOC or Demand Optimized Capacity), which is also the maximum computing capacity of the server farm. Assuming an average load level of 20%, in a load balanced environment this means that all servers are running close to 20% load.

Assuming a power consumption of 200 W idle and 250 W fully loaded—a fairly common range for 1U Servers—this translates to an annual power consumption of $$100\ Servers*(200\ W+20\%*(250\ W-200\ W))*24*365/1000=183{,}960\ kWh$$

Notes: Watt at 20% average load is approximately 20% of the difference between idle and loaded above idle power consumption. kWh per year is watt*number of servers*24 hours*365 days/1000 to convert from Watt to kWatt.

The method presented in this invention, called Demand Balancing, changes the number of servers dynamically and automatically to support the same computing capacity. As a result, instead of 100 servers running at 20%, a smaller amount of servers should be run at 70% (assuming we will keep a 25% safety buffer for unexpected load). The following formula allows us to calculate the number of servers:

$$Nbr\ of\ servers=rounded\ up(target\ load\ \%*nbr\ of\ all\ servers/average\ load\ \%)$$

with target load=optimized load level−buffer %

So in our example the number of servers needed, at 70% average load is

20%*100/70%=28.57→29 Servers

As a result the annual power consumption of 29 Servers at 70% is:

29*(200 W+70%(250 W−200 W))*24*265/1000=59,699 kWh

This translates into savings of around 67% compared to the annual power consumption of a load balanced environment with 100% of the servers being on all the time.

FIG. 6 and the description of said figure provide additional details of the method.

While the example assumes identical power consumption and performance characteristics for all 100 servers, the model is not limited to that. In fact the invention extends on that simple calculation by using an individual DOC value per server or piece of equipment and calculates a matrix of all DOC values and uses efficiency priorities to calculate the amount of equipment needed at any time. Further, the calculation algorithm is modified by the DOC value to determine the first and last server to turn on or off.

As a result the formula of the 100 servers changes to:

$X1$ servers*(average load*Watt difference between idle/loaded+idle Watt)+$X2$ servers*(average load*Watt difference between idle/loaded+idle Watt)+$X3$ servers*(average load*Watt difference between idle/loaded+idle Watt)+ . . . +$Xn$ servers*(average load*Watt difference between idle/loaded+idle Watt) for the total required capacity=TOTAL DOC Based on the TOTAL DOC, the calculation allocates servers until the capacity exceeds the TOTAL DOC:

Total DOC

−$y1$ servers*(target load*Watt difference between idle/loaded+idle Watt)−$y2$ servers*(target load*Watt difference between idle/loaded+idle Watt)−$y3$ servers*(target load*Watt difference between idle/loaded+idle Watt)− . . . −$yn$ servers**(target load*Watt difference between idle/loaded+idle Watt) is below 0.

Selecting y1 is all servers with the highest transaction/kWh number, y2 is all servers with the second highest transaction/kWh number and so on.

Optional constraints are a set number of servers per location—independent of their efficiency—which could mean that y1 could be a specific number of dedicated servers and the efficiency priority comes in at y2 or later.

Furthermore, the invention allows adding price of power at every location and time of the calculation. Instead of using the most efficient servers for allocation the formula can be extended to include Watt*Price to prioritize y1, y2, y3 . . . servers.

The calculation is done by the DDM Cell Engine as part of the Holistic Power Management component in FIG. 1 and outlined in FIG. 2. The calculation is run every cycle to allow adjusting the number of servers as load changes.

To get the reference measurements for all equipment as needed for the allocation prioritization outlined above, a method has been invented as outlined and described in FIG. 4. This method uses software to collect measurement data from an Oscilloscope and power meter and asks for storage of said measurement data in a central database.

The method further describes the collection of power on duration, spike, off, standby, idle, and loaded power consumption as well as power factor etc. Reference measurements are usually done using different voltage levels. The description of FIG. 4 describes more details about the reference measurements.

To get the pricing information from the utility companies a method and apparatus has been invented that collects said data automatically along with additional information from utility companies in a pre-defined cycle. By accessing the utility companies websites, the apparatus collect utility alerts, availability details, current demand and forecast information and stores it in the database for optional use by the DDM Cell Engine. In addition to pulling the data from each utility company, the method and apparatus also allows the utility company to send the information on a regular basis by means of XML/Email or http post which is further processed by the method and apparatus described in FIG. 3.

The method and apparatus for collecting utility information, the method of collecting the reference measurements for equipment, and the method of Holistic Power Management is used to create an apparatus for Holistic Power Management to:

Optimize power consumption and cost of electricity
Forecast demand pattern based on historic data
Automatically adjust service capacity by shutting down servers that are not needed and starting up servers as load increases
Automatically turn off and on power to devices
Automatically adjust air condition and other facility related services
Reduce power consumption of a server farm beyond the savings that can be achieved at the level of individual devices
Allow manual override for special situations The Apparatus of Holistic Power Management To automatically manage an application, servers and network equipment, an apparatus has been invented that implements the method of this invention, automatically determines the best configuration of equipment to be used at any given moment in time, and dynamically adjusts the amount of equipment that is on and off based on said configuration.

The apparatus does not itself turn off any equipment but instead uses well known methods and products to perform such tasks accessing existing products and services using public interfaces/APIs and commands like, WMI, SSH, Telnet, SNMP, Modbus, Bacnet, XMLPost, HTTP(s) and others.

Operational Example

In operation, the apparatus of Holistic Power Management continuously monitors the load of the application environment by accessing load-monitoring services provided by other software typically used in data center environments. This can include number of transactions, network utilization, and number of web pages accessed per second or other information as provided by existing software. Using monitoring services on each supply and demand balancer, the apparatus collects such data using SNMP, Modbus, Ping, XML, SSH and other commonly used protocols to collect the information and puts it into the shared memory for the demand and supply balancer to push it to the centralized XML Interface and from there into the database. This is done as outlined in FIG. 5. The data collection and upload is driven by each demand/supply balancer and the main process as outlined in FIG. 2 is not involved into that collection. In cases of an error when a balancer cannot contact the centralized services, all systems will be turned on to eliminate any reduction in service levels.

The centralized environment will continuously read the data from the various feeding components or processes as outlined in FIG. 2. The data will be verified, in case any data is missing or has not been updated within a configurable time frame, an exception flag will be set for "all-on" status. If all data is available, the DDM Cell Engine will calculate demand and required capacity and the up/down allocation will be calculated. Subsequently the up/down information for cooling adjustments (picked up by the supply balancer) and the up/down information for the server capacity (picked up by the demand balancer) will be queued for the balancers to pick up during the next cycle. After a configurable wait time, the cycle will start all over again.

The selection of components by the up/down allocation module is made based on a lookup within a multi dimensional pre-calculated and real-time updated matrix prepared by the DDM Cell Engine (see FIG. 2):

1. Per Server the matrix includes:
   a. Total transaction capabilities
   b. DOC Max=<ideal load of server>%*total transaction capabilities
   DOC: The Demand Optimized Capacity defines the optimum load based on the lowest cost per transaction on that particular component without overloading said component
   c. Kwh per number of transaction tier=(idle power+ ((100–idle power)*# of transactions/total transaction capability))/1000
2. Per Location the matrix includes:
   a. Cost per kwh at any given time of day
3. Per time interval the matrix also includes current load, current forecasted load and the associated required total DOC The apparatus uses the matrix in the up/down allocation to automatically assign components as needed according to the following model:

Using the required total DOC for the application, the apparatus selects servers from the matrix based on their DOC and price per kwh by subtracting each servers DOC from the total required DOC until the remaining DOC is smaller or equal to 0. At this point the apparatus has a list of components that have the least expensive cost per kwh but are sufficient to support the required load at this time.

The allocation allows for pre-defined minimum number of components at specific locations. If that information is provided, the DOC of all pre-allocated components is added up and subtracted from the total and only the remaining DOC is used for the allocation logic above.

The apparatus uses the list of components that have been allocated and verifies that all of them are physically ON and responsive based on the last measurement results from the balancer—and verifies that the list of non-allocated components are physically OFF.

On error the apparatus as well as each balancer will automatically turn on all equipment under management.

When the balancer picks up the up/down adjustment requests as prepared by the DDM Cell Engine and Up/Down allocation, the balancer will put that information into shared memory for the action services to perform. One or more action services can run on each balancer depending on the amount of devices and control points they have to manage. In addition to up/down adjustments, the balancer will also pick up any configuration changes for its monitoring services. Such information will be put into shared memory for the monitoring services to pick up and process. See FIG. 5 for details.

The apparatus uses other software and hardware products to access components and verify they are responsive including well known software like PING, SSH, TELNET and hardware from ServerTech, WTI, APC, Modius and other companies that offer remote power switching hardware and/or software with programmatically accessible interfaces. The apparatus can also use other system management applications to follow pre-defined processes to shutdown and start up equipment.

If components in the allocated list are non-responsive the apparatus will automatically take them out of the allocation list and re-allocate other components to compensate for the loss in DOC within the next cycle.

As a result the number of components that are running at each location will change during the day dependent upon the load, the predefined constraints, and the cost of electricity.

I claim:

1. A method for reducing the power consumption required to run an application, the method comprising:
   providing a holistic power management component at a central location, the holistic power management component maintaining equipment information across a plurality of data centers;
   wherein a piece of equipment is one of a server, network device, data storage device, or cooling device;
   the holistic power management component performing:
   receiving for each individual piece of equipment across the plurality of data centers, power consumption information;
   measuring power consumed by a set of equipment while running a particular application load to determine a total amount of power required to run the particular application load;
   determining a set of selected equipment to allocate for supporting portions of the particular application load, based at least on the power consumption information collected for said each individual piece of equipment and the total amount of power required to run the particular application load;
   without user interaction, turning on a first selected piece of equipment in the set of selected equipment;
   wherein turning on comprises providing power and operating said each selected piece of equipment;
   wherein the first selected piece of equipment resides in a first data center;
   without user interaction, turning off a second piece of equipment that is not in the set of selected equipment;
   wherein turning off comprises taking said each piece of equipment out of operation and turning off the power to said each piece of equipment;
   wherein the second piece of equipment resides in a second data center that is not the first data center; and
   wherein responsive to an error condition, turning on all of the pieces of equipment.

2. The method of claim 1, wherein power consumption information received for a server comprises an amount of power consumed while the server is running fully loaded, and an amount of power consumed when the server is running idle.

3. The method of claim 1, wherein the power consumption for a cooling device is dependent on the amount of power consumed by the servers, network devices, and data storage devices.

4. The method of claim 1, further comprising adjusting the cooling at each data center based on the capacity at said each data center.

5. The method of claim 1, further comprising adjusting the capacity at each data center so that each server at said each data center runs at a predetermined load level.

6. The method of claim 5, wherein the predetermined load level is 70 percent.

7. The method of claim 1, further comprising:
changing, using a demand balancer at each data center, a power consumption level at each data center dynamically and without user interaction by at least one of:
turning on one or more servers, network equipment, or facility components inside the data center;
shutting down one or more servers, network equipment, or facility components inside the data center; or
turning off one or more servers, network equipment, or facility components inside the data center.

8. The method of claim 7, wherein responsive to changing the power consumption level in said each data center, providing at least the same level of application service at said each data center.

9. The method of claim 7, wherein responsive to changing the power consumption level in said each data center, providing at least the same level of collective application service across all data centers.

10. A system for automatically and dynamically reducing power consumption while maintaining an application service level across a plurality of data centers comprising:
a plurality of pieces of equipment at each data center of the plurality of data enters, each piece of equipment comprising one of a server, network device, storage device, or cooling device;
wherein servers, network devices, and storage devices of the plurality of pieces of equipment operate to provide an application service;
a holistic power management component located in a data center of the plurality of data centers;
wherein the holistic power management component maintains equipment information for the plurality of pieces of equipment across the plurality of data centers; and
a first demand balancer in a first data center, and a second demand balancer in a second data center that is distinct from the first data center;
wherein the holistic power management component reduces the power consumption required to run an application by:
receiving for each individual piece of equipment across the plurality of data centers, power consumption information;
measuring power consumed by a set of equipment while running a particular application load to determine a total amount of power required to run the particular application load;
determining a set of selected equipment to allocate for supporting portions of the particular application load, based at least on the power consumption information collected for said each individual piece of equipment and the total amount of power required to run the particular application load;
wherein the first demand balancer, in response to receiving from the holistic power management component the set of selected equipment, turns on a first selected piece of equipment in the set of selected equipment in the first data center;
wherein turning on comprises providing power and operating said each selected piece of equipment;
wherein the second demand balancer, in response to receiving from the holistic power management component the set of selected equipment, turns off a second piece of equipment in the second data center that is not in the set of selected equipment; and
wherein responsive to an error condition, the first demand balancer turns on all of the pieces of equipment in the first data center; and
wherein turning off comprises taking said each piece of equipment out of operation and turning off the power to said each piece of equipment.

11. The system of claim 10, wherein power consumption information received for a server comprises an amount of power consumed while the server is running fully loaded, and an amount of power consumed when the server is running idle.

12. The system of claim 10, wherein power consumption for a cooling device in a particular data center is dependent on the amount of power consumed by the servers, network devices, and data storage devices located in the particular data center.

13. The system of claim 10, further comprising a supply balancer at each data center that adjusts the cooling at each data center based on the capacity at said each data center.

14. The system of claim 10, wherein the first and second demand balancers each changes a power consumption level in each respective data center dynamically and without user interaction by at least one of:
turning on one or more servers, network equipment, or facility components inside the data center;
shutting down one or more servers, network equipment, or facility components inside the data center; or
turning off one or more servers, network equipment, or facility components inside the data center.

15. The system of claim 14, wherein the system provides at least the same level of application service at said each data center before and after changing power consumption levels within said each data center.

16. The system of claim 14, wherein the system provides at least the same level of collective application service across all data centers before and after changing power consumption levels across one or more data centers.

* * * * *